(12) United States Patent
Adachi (10) Patent No.: US 11,953,771 B2
(45) Date of Patent: Apr. 9, 2024

(54) DETECTION DEVICE AND DISPLAY DEVICE

(71) Applicant: Japan Display Inc., Tokyo (JP)

(72) Inventor: Koichiro Adachi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/831,891

(22) Filed: Jun. 3, 2022

(65) Prior Publication Data

US 2022/0299814 A1    Sep. 22, 2022

Related U.S. Application Data (63) Continuation of application No. PCT/JP2020/043914, filed on Nov. 25, 2020.

(30) Foreign Application Priority Data

Dec. 4, 2019   (JP) ................................ 2019-219728

(51) Int. Cl.
    | | |
    |---|---|
    | *G02F 1/1333* | (2006.01) |
    | *G02F 1/1343* | (2006.01) |
    | *G06F 3/041* | (2006.01) |
    | *G06F 3/044* | (2006.01) |

(52) U.S. Cl.
    CPC .... *G02F 1/13338* (2013.01); *G02F 1/134309* (2013.01); *G02F 1/134363* (2013.01); *G06F 3/0412* (2013.01); *G06F 3/0445* (2019.05); *G06F 3/0446* (2019.05)

(58) Field of Classification Search
    CPC ........... G02F 1/13338; G02F 1/134363; G06F 3/0412; G06F 3/0445; G06F 3/0446
    See application file for complete search history.

(56) References Cited

U.S. PATENT DOCUMENTS

| | | |
|---|---|---|
| 2013/0189502 A1 | 7/2013 | Takahashi et al. |
| 2014/0043252 A1 | 2/2014 | Kim et al. |
| 2015/0042909 A1 | 2/2015 | Sekiguchi |
| | (Continued) | |

FOREIGN PATENT DOCUMENTS

| | | |
|---|---|---|
| JP | 2012-181815 A | 9/2012 |
| JP | 2015-035122 A | 2/2015 |
| | (Continued) | |

OTHER PUBLICATIONS

International Search Report issued in International Patent Application No. PCT/JP2020/043914 dated Feb. 16, 2021 and English translation of same. 5 pages.

(Continued)

*Primary Examiner* — Jessica M Merlin
(74) *Attorney, Agent, or Firm* — K&L Gates LLP (57) ABSTRACT

According to one embodiment, a detection device includes a substrate and a plurality of sensor electrodes provided on the substrate, extending along a first direction and arranged to be spaced apart from each other along a second direction intersecting the first direction. The sensor electrodes form a plurality of detection areas extending in the first direction and a plurality of non-detection areas adjacent to the plurality of detection areas along the second direction, and a boundary between each of the detection areas and each respective one of the non-detection areas is not linear.

2 Claims, 12 Drawing Sheets

(56) References Cited

U.S. PATENT DOCUMENTS

| | | | |
|---|---|---|---|
| 2015/0220179 A1* | 8/2015 | Kimura | G06F 3/0443 345/174 |
| 2015/0355751 A1 | 12/2015 | Kurasawa et al. | |
| 2017/0308211 A1* | 10/2017 | Adachi | G02F 1/134309 |
| 2020/0363908 A1 | 11/2020 | Yamai et al. | |

FOREIGN PATENT DOCUMENTS

| | | |
|---|---|---|
| JP | 2015-232817 A | 12/2015 |
| JP | 2016-197293 A | 11/2016 |
| JP | 2017-198729 A | 11/2017 |
| WO | WO2019/176758 A1 | 9/2019 |

OTHER PUBLICATIONS

Written Opinion issued in International Patent Application No. PCT/JP2020/043914 dated Feb. 16, 2021. 4 pages.

\* cited by examiner

DETECTION DEVICE AND DISPLAY DEVICE

CROSS-REFERENCE TO RELATED APPLICATIONS

This application is a Continuation Application of PCT Application No. PCT/JP2020/043914, filed Nov. 25, 2020 and based upon and claiming the benefit of priority from Japanese Patent Application No. 2019-219728, filed Dec. 4, 2019, the entire contents of all of which are incorporated herein by reference.

FIELD

Embodiments described herein relate generally to a detection device and a display device.

BACKGROUND

In recent years, display devices with touch detection functions have been attracting attention. As a method of detecting a touch on such display devices, a static capacitance method, electromagnetic induction method and the like are known. Of these, in the capacitance method, a plurality of drive electrodes and a plurality of detection electrodes are arranged in a matrix, an electric field is generated using these drive electrodes and detection electrodes, and changes in the electric field are detected, thereby detecting touches.

Such a display device generally includes detection areas where the detection electrodes are arranged and non-detection areas each between two adjacent detection electrodes, where no detection electrodes are arranged, and boundaries between detection areas and non-detections are visible to the observer by reflected light, thus resulting in such a drawback of a poor appearance of the display device.

DETAILED DESCRIPTION

In general, according to one embodiment, a detection device comprises a substrate and a plurality of sensor electrodes provided on the substrate, extending along a first direction and arranged to be spaced apart from each other along a second direction intersecting the first direction. The sensor electrodes form a plurality of detection areas extending in the first direction and a plurality of non-detection areas adjacent to the plurality of detection areas along the second direction, and a boundary between each of the detection areas and each respective one of the non-detection areas is not linear.

According to another embodiment, a display device comprises the detection device, a common electrode opposing the sensor electrodes, which functions as a drive electrode as well, a pixel electrode opposing the common electrode and a liquid crystal layer in which alignment is controlled by an electric field generated between the common electrode and the pixel electrode.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In the embodiment, a display device with touch detection function is disclosed as an example of the detection device. Further, in this embodiment, a display device comprising a display panel which uses a liquid crystal display element is disclosed as a display device having a touch detection function. But the individual technical ideas disclosed in this embodiment may be applied to a display device equipped with a display panel using display elements other than liquid crystal display elements. As display panels using display elements other than liquid crystal display elements, self-illuminated display panels having organic electroluminescent display elements, etc., and electronic paper-type display panels having electrophoretic elements, etc., are examples.

Figure 1:
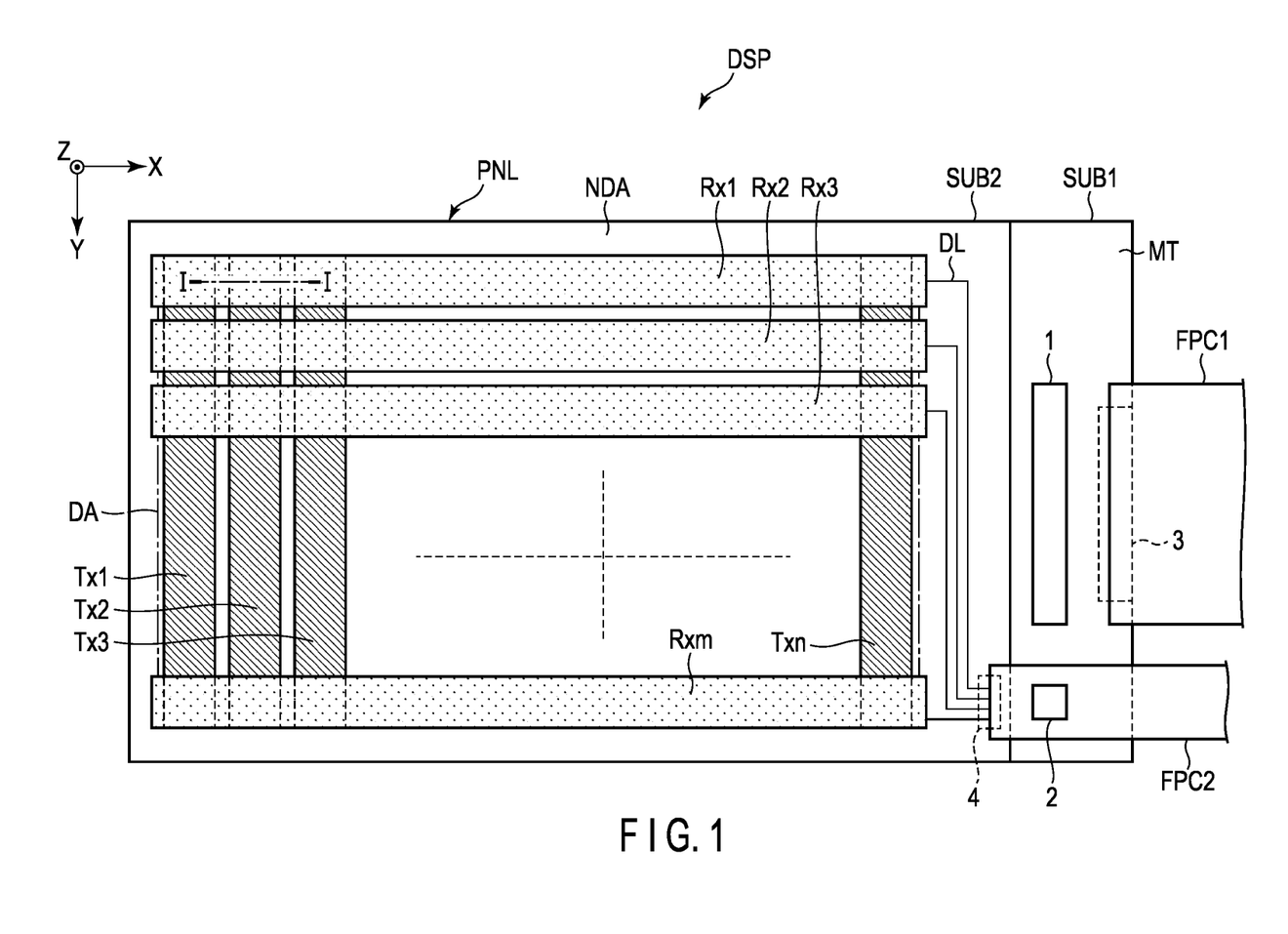
FIG. 1 is a plan view showing a configuration of a display device according to one embodiment.

FIG. 1 is a plan view of a configuration example of a display device DSP of the embodiment. For example, a first direction X, a second direction Y and a third direction Z are orthogonal to each other, but they may intersect at an angle other than 90 degrees. The first direction X and the second direction Y are parallel to the main surface of each substrate of the display device DSP. The third direction Z corresponds to the thickness direction of the display device DSP. In the following descriptions, the direction toward the second substrate SUB2 from the first substrate SUB1 is referred to as "above" (or simply, up), and the direction toward first substrate SUB1 to the second substrate SUB2 is referred to as "below" (or simply, down). With such expressions "a second member above a first member" and "a second member below a first member", the second member may be in contact with the first member or may be remote from the first member. Further, it is also assumed that there is an observation position to observe the display device DSP on a tip side of the arrow indicating the third direction Z. From this observation position, viewing toward an X-Y plane defined by the first direction X and the second direction Y is called "plane view".

As shown in FIG. 1, the display device DSP comprises a display panel PNL, a flexible printed circuit FPC1, a flexible printed circuit FPC2, a driver IC1, touch detector IC2 and the like.

The display panel PNL comprises a rectangular first substrate SUB1 and a rectangular second substrate SUB2 opposing the first substrate SUB1. In the example shown in FIG. 1, the first substrate SUB1 and the second substrate SUB2 are attached together while three edges thereof respectively matching with each other. The display panel PNL comprises a display area DA which displays images and a frame-like non-display area NDA surrounding the display area DA in a region where the first substrate SUB1 and the second substrate SUB2 oppose each other.

The display area DA contains a plurality of drive electrodes Tx (Tx1 to Txn) and a plurality of detection electrodes Rx (Rx1 to Rxm) respectively opposing the drive electrodes Tx, disposed therein. The detection electrodes Rx may be referred to as "sensor electrodes". The drive electrodes Tx and the detection electrodes Rx intersect each other in plan view. Here, n and m are both positive integers, and n and m may be equal to or different from each other.

The drive electrodes Tx each extend along the second direction Y and are arranged along the first direction X so as to be spaced apart from each other. The detection electrodes Rx each extend along the first direction X and arranged along the second direction Y so as to be spaced apart from each other. The drive electrodes Tx and the detection electrodes Rx are made of, for example, a transparent conductive material such as indium tin oxide (ITO), indium zinc oxide (IZO) or the like. Although omitted from the illustrating in FIG. 1, between a detection electrode Rx (for example, a detection electrode Rx1) and another detection electrode Rx (for example, a detection electrode Rx2 adjacent to the detection electrode Rx), a dummy electrode made of the same material as that of the detection electrodes Rx is placed. The details of the dummy electrode are omitted here as they will be described later.

Although omitted from the illustration in FIG. 1, a plurality of pixels including display elements are arranged in a matrix in the display area DA, and images are displayed as video signals are supplied to these pixels.

The driver IC1 is configured to execute various types of controls related to image display, and in the example shown in FIG. 1, it is mounted on a terminal area MT, which is a region of the second substrate SUB2, which does not oppose the first substrate SUB1. Note that FIG. 1 shows the case where the driver IC1 is mounted by a Chip-On-Glass (COG) method, but the method is not limited to this. For example, the driver IC1 can be mounted on the flexible printed circuit FPC1. On the terminal region MT, a mount terminal 3 is formed in the terminal area MT, and the display panel PNL and the flexible printed circuit FPC1 are electrically connected to each other via the mount terminal 3.

The touch detector IC2 is configured to execute various types of controls related to the detection of objects that come in contact with or proximity to the display panel PNL (touch detection). In the example shown in FIG. 1, it is mounted on the flexible printed circuit FPC2. On an edge portion of the second substrate SUB2, a mount terminal 4 is formed and the detection electrode Rx is connected to the mount terminal 4 via a detection wiring line DL.

Figure 2:
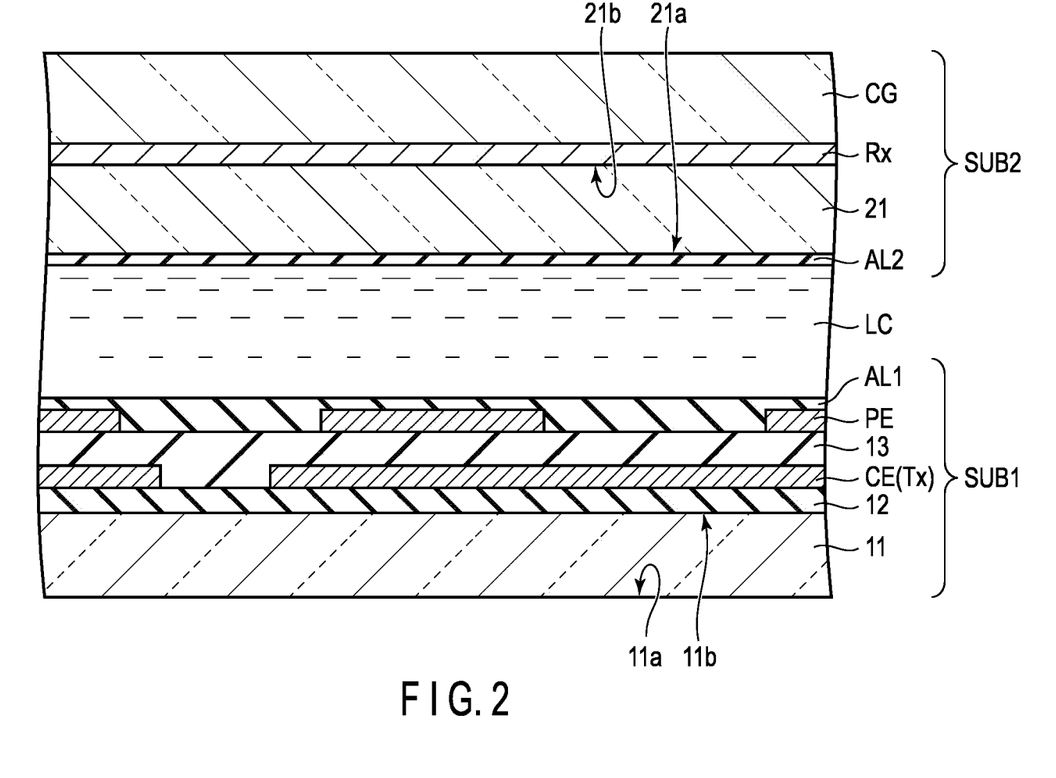
FIG. 2 is a cross-sectional view thereof when taken along line I-I shown in FIG. 1.

FIG. 2 shows a configuration example of the display device DSP (the display panel PNL), and is a cross-sectional view thereof when taken along line I-I shown in FIG. 1.

As shown in FIG. 2, the display panel PNL comprises a first substrate SUB1, a second substrate SUB2, a liquid crystal layer LC as a display functional layer, a sealant (not shown). The first substrate SUB1 and the second substrate SUB2 are each formed as a flat plate parallel to the X-Y plane. The first substrate SUB1 and the second substrate SUB2 are superimposed on one another in plan view and adhered together by the sealant. The liquid crystal layer LC is held between the first substrate SUB1 and the second substrate SUB2 and sealed by the sealant.

As shown in FIG. 2, the first substrate SUB1 comprises an insulating substrate 11, an insulating film 12, common electrodes CE, an insulating film 13, pixel electrodes PE, an alignment film AL1. Note that the first substrate SUB1 further comprises scanning lines, signal lines, switching elements and the like, which are electrically connected the driver IC1, in addition to the various types of configurations described above, but these elements are omitted from the illustration in FIG. 2.

The insulating substrate 11 comprises a main surface (a lower surface) 11a and a main surface (an upper surface) 11b on an opposite side to the main surface 11a. The insulating film 12 and the insulating film 13 are each constituted by at least one or more insulating films and contain an inorganic insulating film, an organic insulating film and the like. The common electrode CE is located on the insulating film 12. The common electrodes CE function as the drive electrodes Tx as well, described above. The insulating film 13 covers the common electrodes CE. The pixel electrodes PE are located on the insulating film 13 and oppose the common electrodes CE. The common electrodes CE and the pixel electrodes PE, respectively, form storage capacitances for image display. The alignment film AL1 covers the pixel electrodes PE and is in contact with the liquid crystal layer LC.

As shown in FIG. 2, the second substrate SUB2 comprises an insulating substrate 21, an alignment film AL2, detection electrodes Rx, and a cover member CG. Note that the second substrate SUB2 further comprises an overcoat layer, color filters, light-shielding films and the like in addition to the various types of configurations described above, but these elements are omitted from the illustration in FIG. 2.

The insulating substrate 21 comprises a main surface (a lower surface) 21a and a main surface (an upper surface) 21b on an opposite side to the main surface 21a. The main surface 21a of the insulating substrate 21 opposes the main surface 11b of the insulating substrate 11. The alignment film AL2 is in contact with the liquid crystal layer LC. The detection electrodes Rx are disposed on the main surface 21b of the insulating substrate 21, and a cover member CG is placed over the detection electrodes Rx.

The liquid crystal layer LC is disposed between the main surface 11b and the main surface 21a, and is in contact with the alignment films AL1 and AL2. The liquid crystal layer LC contains, for example, a nematic liquid crystal. Liquid crystal molecules in the liquid crystal layer LC are stationary in an initial alignment state when no electric field is generated between the common electrode CE and the respective pixel electrode PE. On the other hand, when an electric field is generated between the common electrode CE and the pixel electrode PE, the alignment of the liquid crystal molecules changes from the initial alignment state.

The insulating substrate 11 and the insulating substrate 21 are, for example, glass substrates or plastic substrates or the like. The insulating film 12 and the insulating film 13 are each formed of, for example, a transparent insulating material such as silicon oxide, silicon nitride, silicon oxynitride, acrylic resin or the like. The pixel electrodes PE and the common electrodes CE are transparent electrodes each formed of, for example, a transparent conductive material such as indium tin oxide (ITO), indium zinc oxide (IZO) or the like. The alignment film AL1 and the alignment film AL2 are horizontal alignment films having an alignment restriction force substantially parallel to the X-Y plane. The alignment restriction force may be imparted by a rubbing process or by a photo-alignment process. The detection electrodes Rx are formed of the same material as that of the common electrodes CE, which function as the drive electrodes Tx as well as described above, which is, for example, ITO, IZO or the like. The cover member CG is, for example, an insulating substrate such as a glass substrate, plastic substrate or the like.

In the following descriptions, between an area A1 where the detection electrodes Rx are disposed (to be referred to as a "detection area" hereinafter) and an area A2 where the dummy electrodes Dx are disposed in place of that the detection electrodes Rx are not disposed (to be referred to as "non-detection area" hereinafter), a boundary B is formed, which is will be explained in terms of the shape in detail.

Figure 3:
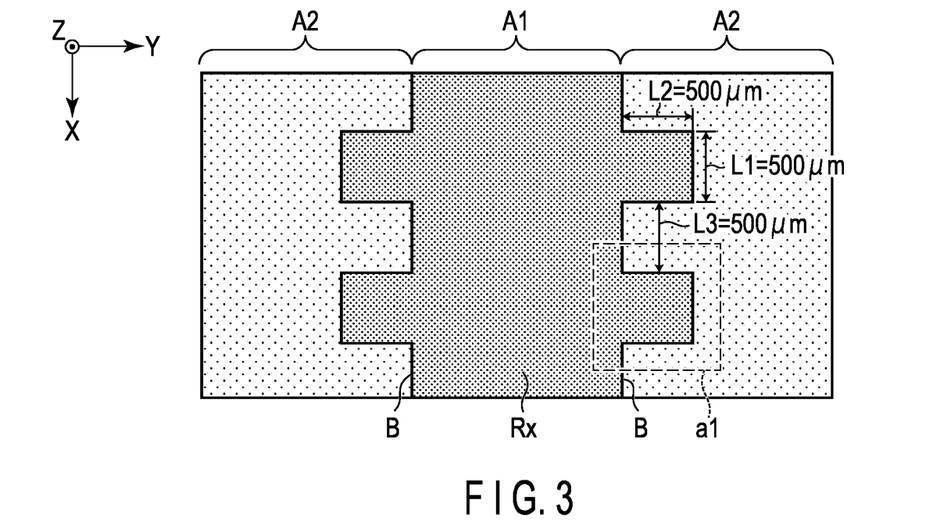
FIG. 3 is a schematic diagram showing a shape of a boundary between a detection area and a non-detection area in this embodiment.

FIG. 3 is a schematic diagram showing the shape of the boundaries B between the detection area A1 and the non-detection areas A2 in this embodiment. As shown in FIG. 3, the detection region A1 and the non-detection regions A2 both extend along the first direction X and are located adjacent to each other along the second direction Y. As shown in FIG. 3, the boundaries B between the detection area A1 and the non-detection areas A2, respectively, each include, in plan view, recesses and projections of a rectangular corrugated shape. The configuration of FIG. 3 is on the assumption that a lengths L1 of one rectangular waveform along the first direction X and a length L2 along the second direction Y is, for example, 500 µm, and a length L3 from one rectangular wave to the next rectangular wave adjacent thereto along the first direction (that is, a length L3 between rectangular waves) is also, for example, 500 µm.

Figure 4:
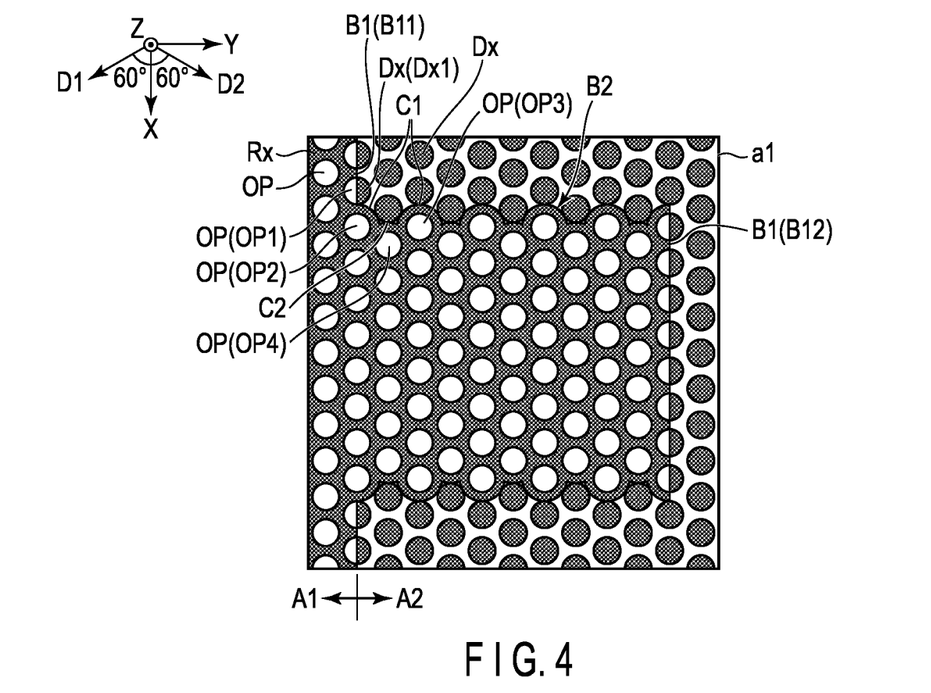
FIG. 4 is a partially enlarged view of the illustration of FIG. 3.

FIG. 4 is an enlarged view of an area a1 encircled by dotted lines in FIG. 3.

The detection electrode Rx disposed in the detection area A1 comprise, in plan view, a number of circular openings OP formed therein, and the openings OP are arranged in a matrix so as to be spaced apart from each other. Although omitted from the illustration in FIG. 4, the detection electrode Rx is electrically connected to the touch detector IC2 via the respective detection wiring line DL, mount terminal 4 and the flexible printed circuit FPC2.

In the non-detection area A2, a number of dummy electrodes Dx, which are circular in shape in plan view, are formed, and the dummy electrodes Dx are arranged in a matrix so as to be spaced apart from each other. The dummy electrodes Dx are electrically independent electrodes unlike in the case of the detection electrodes Rx.

It is preferable that the openings OP formed in the detection electrode Rx and the dummy electrodes Dx formed in the non-detection area A2 should be the same as each other in shape and size. Further, as mentioned above, the detection electrodes Rx and the dummy electrodes Dx are formed of the same material, specifically, a transparent conductive material such as ITO or the like.

As shown in FIG. 4, the circular openings OP and the circular dummy electrodes Dx disposed in the detection area A1 and the non-detection area A2 are arranged in a relationship of the close-packed structure. In other words, both the circular openings OP and the dummy electrodes Dx extend along the first direction X, and extend along a direction D1, which is a direction rotated by 60 degrees clockwise from the first direction X, and extend along direction D2, which is a direction rotated by 60 degrees counterclockwise from the first direction X.

Here, of the boundary B between the detection area A1 and the non-detection area A2, a straight boundary B1 extending along the first direction X (and also a boundary B11, which is a part of the recessed portion of the rectangular wave) will be focused. As shown in FIG. 4, in the boundary B1, the openings OP1, which are semicircular in plan view, are formed on a detection area A1 side across the boundary B1, and the dummy electrodes Dx1, which are semicircular in plan view, are formed on a non-detection area A2 side. The shape formed by the opening OP1 and the dummy electrode Dx1, which are adjacent to each other across the boundary B1 is the same as one of the circular opening OP disposed in the detection area A1 and one of the circular dummy electrodes Dx disposed in the non-detection area A2.

Next, of the boundary B between the detection area A1 and the non-detection area A2, a boundary B2 extending toward the non-detection area A2 side now will be focused. As shown in FIG. 4, the boundary B2 includes a plurality of first curvature portions C1 curved along outer circumference of semicircular openings OP2 located on the boundary B1, circular openings OP2 adjacent to each other along the first direction X, or circular and semicircular openings OP3 arranged on the same row as that of the openings OP2 and towards the non-detection area A2 side, and one or more second curvature portion C2 curved along openings OP4 adjacent to the openings OP2 or openings OP2 and the direction D1 or direction D2, and connecting the first curvature portions C1 adjacent to each other along the second direction.

The first curvature portions C1 and the second curvature portions C2 have a shape similar to an arc of a fan with a center angle of 90 degrees, or a shape similar to an arc of a fan with a center angle of 180 degrees. The first curved portions C1 and the second curved portions C2 are in contact with the circular dummy electrodes Dx located on the non-detection area A2 side across the boundary B2.

Note that in FIG. 4, one boundary B1 and one boundary B2 of the boundaries B1 and B2 are focused for description, but the description can be applied to any one of the boundaries B1 and boundaries B2.

Subsequently, a comparative example will be provided to describe the effect of the display device DSP of this embodiment (in other words, as shown in FIGS. 3 and 4, the effect of the display panel PNL in which the detection electrodes Rx and the dummy electrode Dx are arranged). Note that the comparative example is designed to illustrate some of the effects that the panel PNL can exhibits, but not to exclude from the scope of the present invention, configurations that are common to the comparative example and the present embodiment.

Figure 5:
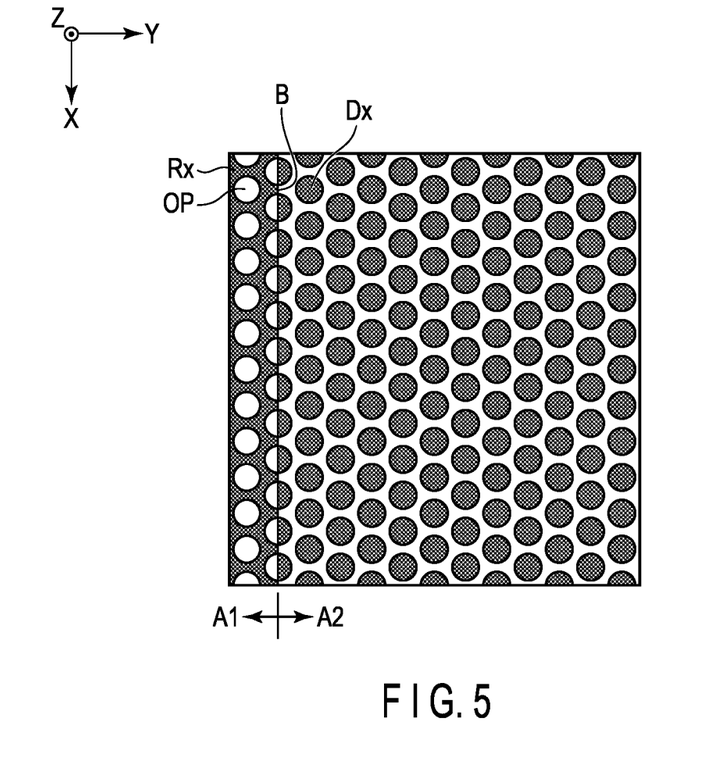
FIG. 5 is a schematic diagram showing a shape of boundaries between detection areas and non-detection areas in a comparative example.

The comparative example is different from the present embodiment in that, as shown in FIG. 5, the detection electrodes Rx and the dummy electrodes Dx are arranged so that the boundary B between the detection area A1 and the non-detection area A2 is shaped into a single straight line extending along the first direction X.

Generally, the detection electrodes Rx are formed into a tapered shape, and therefore when external light is made incident on the display panel PNL from a direction perpendicular to the direction in which the detection electrodes Rx extend, the incident light is reflected on the tapered side of the detection electrodes Rx (that is, the edge of the detection electrode Rx). If this reflected light is seen by the observer, the boundary B between the detection area A1 and the non-detection area A2 is visually recognized, thus resulting in a poor appearance.

The comparative example is based on the assumption that, as shown in FIG. 5, the boundary B between the detection area A1 and the non-detection area A2 is a single straight line extending along the first direction X. In other words, it is assumed that the detection electrodes Rx are disposed linearly in the detection area A1, and therefore when external light is made incident from the vertical direction of the boundary B, the incident light is regularly reflected by tapered side surfaces of the detection electrodes Rx linearly arranged. With this structure, as described above, the boundary B between the detection area A1 and the non-detection area A2 is visually recognized to the observer, which can cause a drawback of poor appearance.

In contrast, as shown in FIGS. 3 and 4, the display panel PNL of this embodiment comprises detection electrodes Rx disposed therein so that the boundary B between the detection area A1 and the non-detection area A2 is formed into a rectangular wave, and therefore when external light is made incident from the vertical direction of the boundary B, the incident light does not hit the tapered side surfaces of the detection electrodes Rx that form the boundary B2, but is not reflected by the tapered side surfaces of the detection electrodes Rx that form the boundary B2. With this structure, it is possible to suppress the boundary B2 from being visually recognized by the observer.

On the other hand, light made incident from the vertical direction of the boundary B hits the tapered side surfaces of the detection electrodes Rx that form a boundary B11, to be reflected. But, since the boundaries B11 and B12 are not located on the same line, the light reflected by the tapered side surfaces of the detection electrodes Rx that forms the boundary B11 and the light reflected by the tapered side surfaces of the detection electrodes Rx that form the boundary B12 have optical path lengths different from each other. With this structure, it is possible to suppress the boundary B11 and the boundary B12 from being visually recognized by the observer as a single straight line.

As described above, in the display panel PNL of this embodiment, the detection electrodes Rx are arranged such that the boundary B between the detection area A1 and the non-detection area A2 is formed into a rectangular wave. With this structure, even if external light is made incident from the vertical direction of the boundary B, it is possible to suppress the boundary B from being visually recognized by the observer. Thus, an advantageous effect of improving the appearance of the display panel PNL can be obtained.

Figure 6:
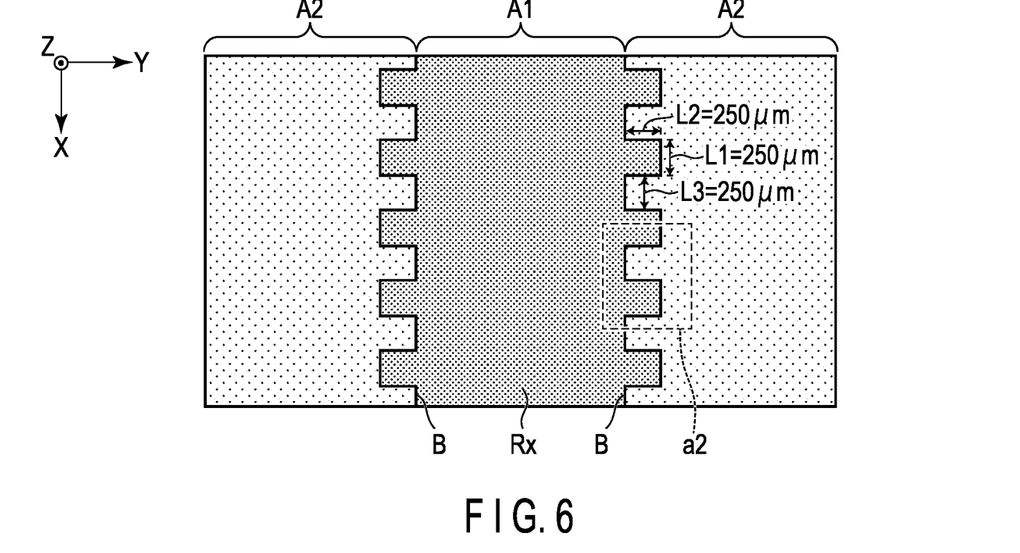
FIG. 6 is a schematic diagram showing a modified example of the shape of the boundary between the detection area and the non-detection area.
Figure 7:
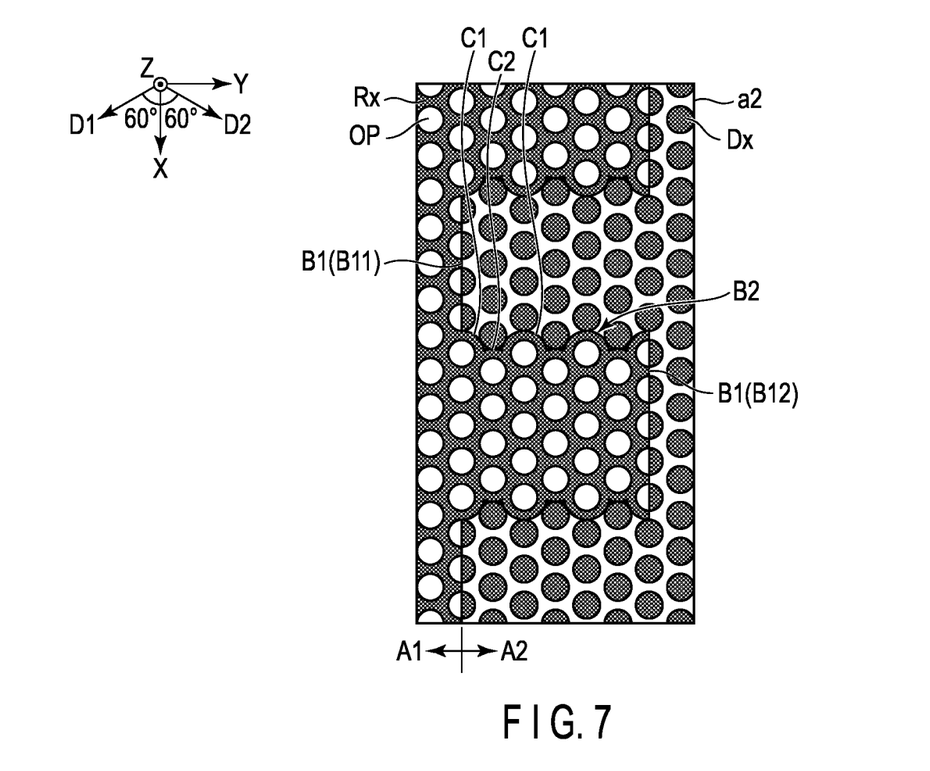
FIG. 7 is a partially enlarged view of the illustration of FIG. 6.
Figure 8:
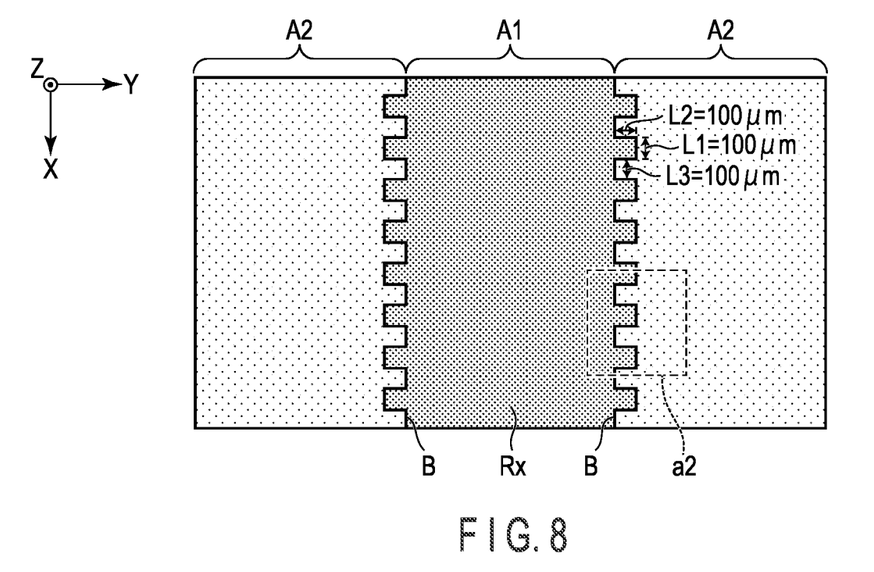
FIG. 8 is a schematic diagram showing a modified example of the shape of the boundary between the detection area and the non-detection area in the embodiment.
Figure 9:
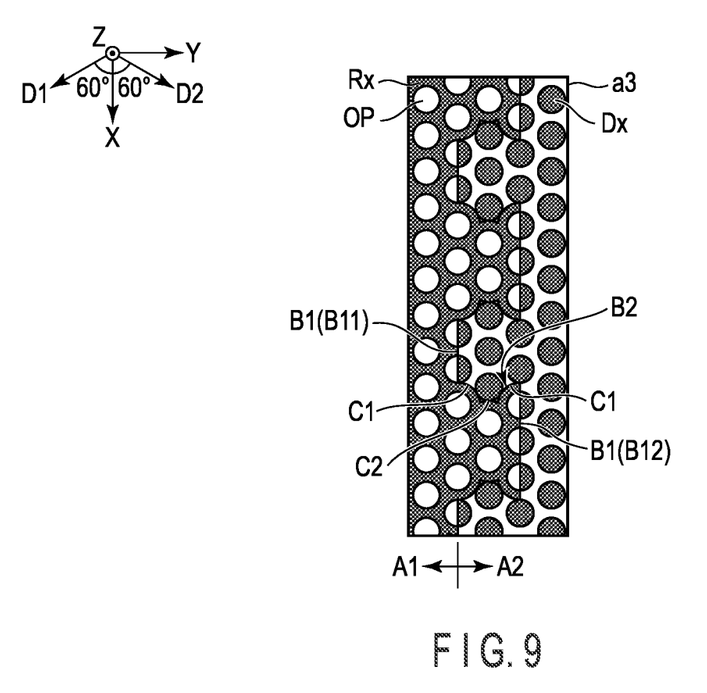
FIG. 9 is a partially enlarged view of the illustration of FIG. 8.

FIGS. 6 to 9 are diagrams schematically showing modified examples of the shape of the boundary B between the detection area A1 and the non-detection area A2 in this embodiment. The cases of FIGS. 6 to 9 are similar to those of FIGS. 3 and 4 in that the boundary B between the detection area A1 and the non-detection area A2 has recesses and projections of a rectangular wave shape in plan view, but are different in that lengths L1 to L3 are not 500 μm. More specifically, FIGS. 6 and 7 show the cases where the lengths L1 to L3 are 250 μm, whereas FIGS. 8 and FIG. 9 show the cases where the lengths L1 to L3 are 100 μm. Note that these modified examples are similar to the cases of FIGS. 3 and 4 in that the boundary B1 of the boundary B is formed by semicircular openings OP1 and semicircular dummy electrodes Dx1 and that the boundary B2 of the boundary B is formed by first curved portions C1 and second curved portions C2, and therefore detailed descriptions thereof will be omitted here.

Generally, it is known that the resolution of the human eye is 200 μm or less, and the shape and the like of an object of 200 μm or less cannot be seen accurately by human. Therefore, from the viewpoint of the resolution of the human eye, it is preferable that the lengths L1 to L3 mentioned above be 200 μm or less. On the other hand, if the lengths L1 to L3 mentioned above are extremely small, a linear boundary extending along the first direction X, that is, a boundary similar to that shown in FIG. 5 is obtained. As a result, between the light reflected by the tapered side surfaces of the detection electrodes Rx that form the boundary B11 and the light reflected by the tapered side surfaces of the detection electrodes Rx that form the boundary B12, there is no substantial difference crated in the length of optical path. With this structure, there is a risk that the boundary B may be visually recognized by the observer. Thus, from the viewpoint of visual recognition, it is preferable that the lengths L1 to L3 described above not be extremely small.

As described above, in consideration of both the resolution of the human eye and the visual recognition, if the boundary between the detection area A1 and the non-detection area A2 is shaped into a rectangular wave, the lengths L1 to L3 mentioned above should preferably be 100 μm or more and 300 μm or less. With this structure, it is possible to suppress the boundary B from being visually recognized by the observer and to improve the appearance.

Figure 10:
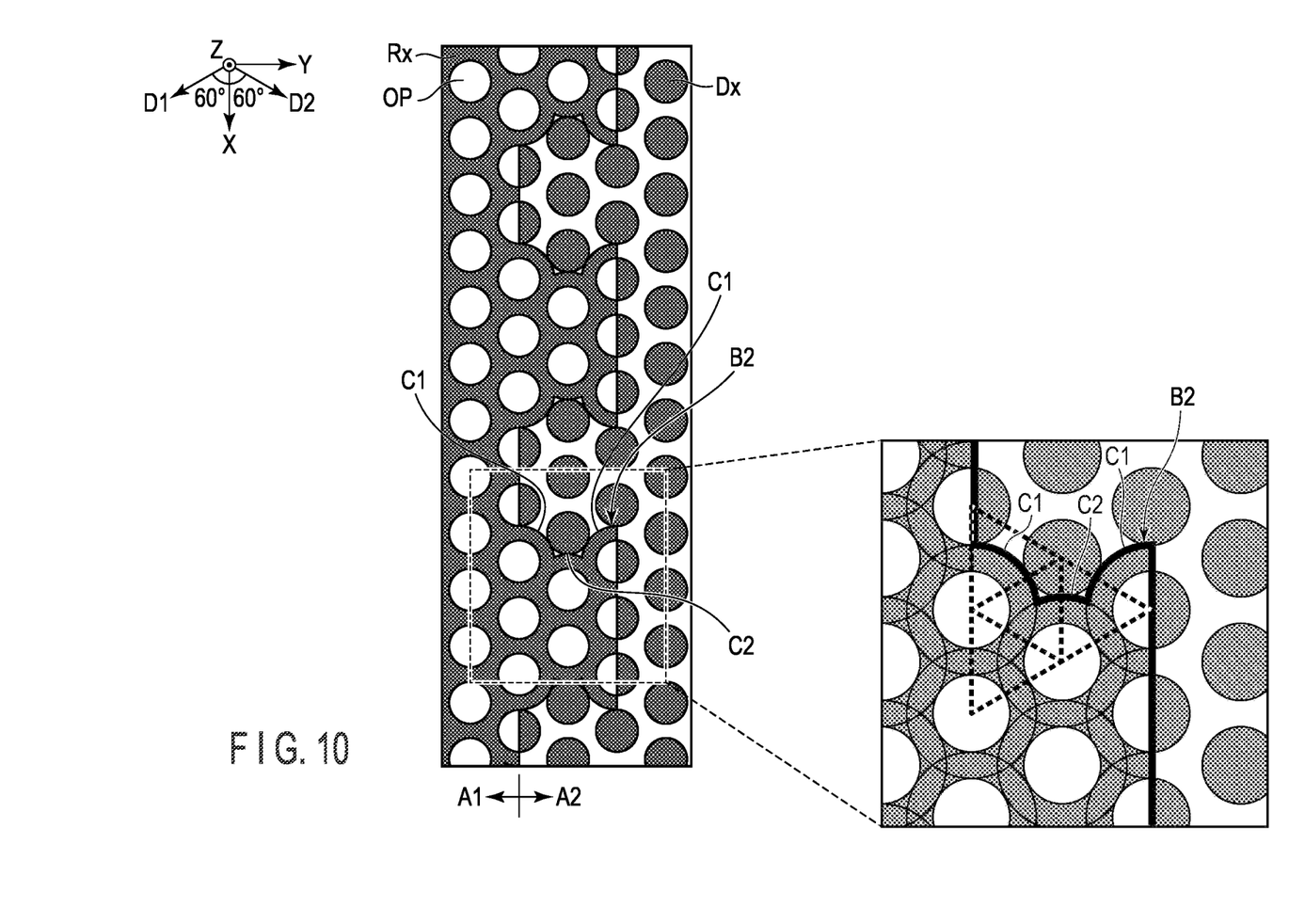
FIG. 10 is a partially enlarged view of the illustration of FIG. 9.
Figure 11:
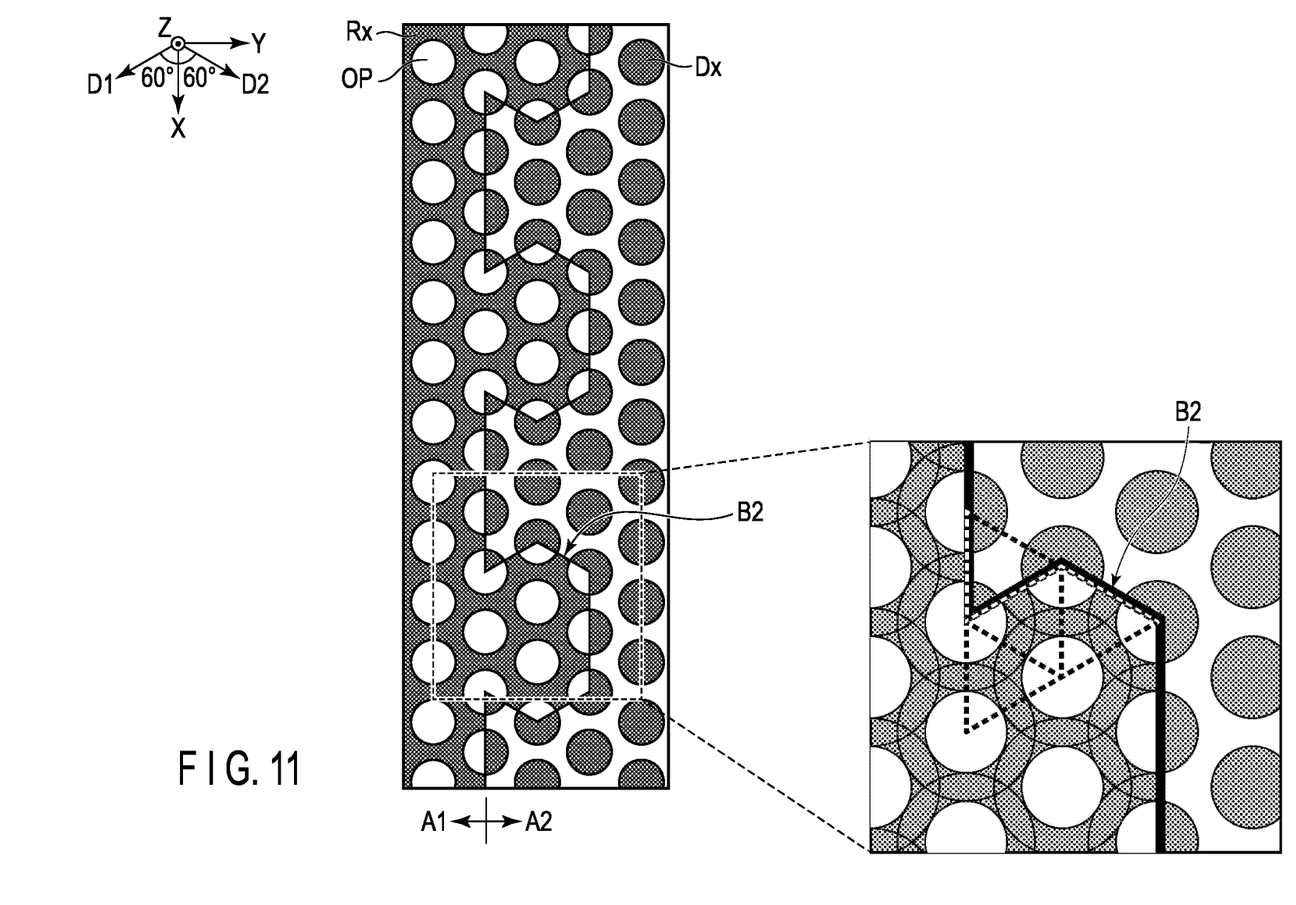
FIG. 11 is a schematic diagram showing a modified example of the shape of the boundary between the detection area and the non-detection area in the embodiment.

FIG. 10 is a partially enlarged view of the illustration of the enlarged view of FIG. 9 to illustrate the modified shown in FIG. 11, and FIG. 11 is a schematic diagram showing a modified example of the shape of the boundary B between the detection area A1 and the non-detection area A2.

According to the studies made by the inventors, when the boundary B2 of the boundary B is formed of the first curved portion C1 and the second curved portion C2, it is known that the occupancy ratio of the transparent conductive material (conductive film) which forms the detection electrodes Rx and the dummy electrodes Dx per unit area enclosed by the dotted line in FIG. 10 exceeds 50%. Further, it is known according to the studies made by the inventors that as the occupancy ratio of the conductive film per unit area is closer to 50%, it is harder that the boundary B is visually recognized. Note that the unit area is defined by an aggregation of equilateral triangles formed when connecting the centers of three openings OP and/or dummy electrodes Dx, which are arranged in the relationship of the close-packed structure.

By contrast, when the circular openings OP formed in the detection electrodes Rx and the dummy electrodes Dx formed in the non-detection area A2 are cut along the direction of the close-packed structure, that is, the first direction X, or one of the direction D1 and the direction D, the boundary B2 of the boundary B can be shaped so as shown in FIG. 11. With this structure, it is possible to make the occupancy ratio of the conductive film per unit area surrounded by the dotted line in FIG. 11 to 50%.

As described above, by extending the boundary B2 out of the boundary B along the direction along the close-packed structure, it is possible to make the occupancy ratio of the conductive film per unit area 50%. With this structure, it is possible to further suppress the boundary B from being visually recognized by the observer and to further improve the appearance.

Figure 12:
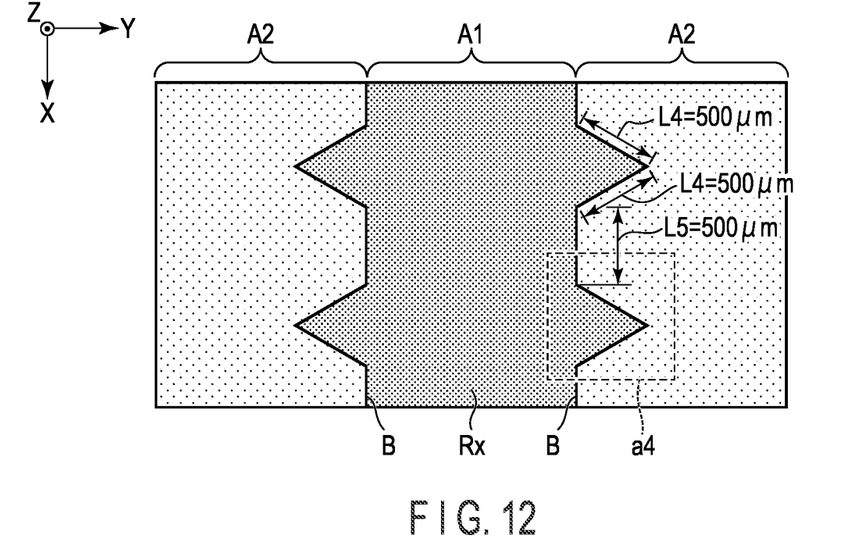
FIG. 12 is a schematic diagram showing a modified example of the shape of the boundary between the detection area and the non-detection area in the embodiment.

FIG. 12 is a schematic diagram showing a modified example of the shape of the boundary B between the detection area A1 and the non-detection area A2 in this embodiment. As shown in FIG. 12, the boundary B between the detection area A1 and the non-detection area A2 may be a triangular wave shape in plan view. Note that as shown in FIG. 12, the triangular shapes contained in the triangular wave should preferably be equilateral triangles in consideration of the arrangement of the openings OP and the dummy electrodes Dx to have a relationship of the close-packed structure. In FIG. 12, it is assumed that a length L4 of one side of the equilateral triangles contained in the triangular wave is, for example, 500 μm, and a length L5 from one triangular wave to the next adjacent triangular wave along the first direction X (that is, the distance L5 between triangular waves) is also, for example, 500 μm. Note that the lengths L4 and L5 described above are not limited to 500 μm, but may be 100 μm or 250 μm. As mentioned above, in consideration of both the resolution of the human eye and the visual recognition, the lengths L4 and L5 should preferably be 100 μm or more but 300 μm or less.

Figure 13:
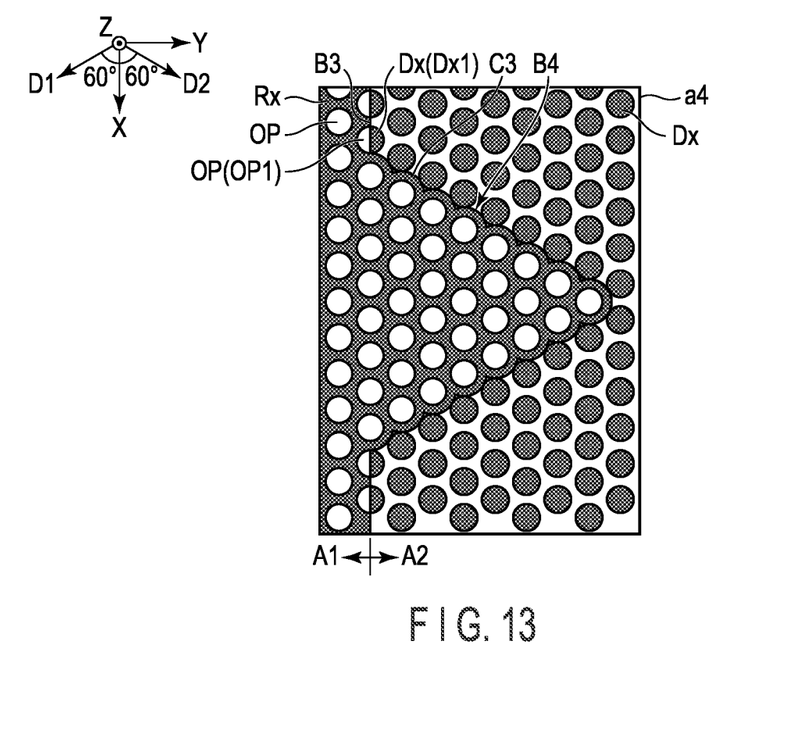
FIG. 13 is a partially enlarged view of the illustration of FIG. 12.

FIG. 13 is an enlarged view of an area a4 surrounded by dotted lines in FIG. 12.

As shown in FIG. 13, in a linear boundary B3 extending along the first direction X of the boundary B between the detection area A1 and the non-detection area A2, openings OP1 semicircular in plan view are formed on the detection area A1 side across the boundary B3, and dummy electrodes Dx1 semicircular in plan view are formed on the non-detection area A2 side, as in the case shown in FIG. 4.

On the other hand, as shown in FIG. 13, of the boundary B between the detection area A1 and the non-detection area A2, a boundary B4, which extends toward the non-detection area A2 side and corresponds to one side of an equilateral triangle contained in the triangular wave, contains a plurality of third curvature portions C3 disposed on the detection area A1 side across the boundary B4 and curved along outer circumferences of the circular openings OP arranged along the direction D1 or D2. The third curved portions C3 are in contact with circular dummy electrodes Dx located on the non-detection area A2 side across the boundary B4.

As shown in FIGS. 12 and 13, in the case where the boundary B between the detection area A1 and the non-detection area A2 is formed into a triangular wave, when external light is made incident from the perpendicular direction of the boundary B, the incident light does not hit the tapered side surfaces of the detection electrodes Rx that form the boundary B4, or is not reflected by the tapered side surfaces of the detection electrodes Rx that form the boundary B4. Therefore, it is possible to suppress the boundary B4 from being visually recognized by the observer.

On the other hand, light made incident from the perpendicular direction of boundary B hits and is reflected by the tapered side surfaces of the detection electrodes Rx that form the boundary B3. However, the boundary B3 is formed in the form of one straight line, but intermittently with intervals along the first direction X. Therefore, as in the comparative example shown in FIG. 5, it is possible to suppress the boundary B3 from being visually recognized as a single straight line by the observer.

As described above, even when the detection electrodes Rx are disposed so that the boundary B between the detection area A1 and the non-detection area A2 is formed into a triangular wave, it is still possible to suppress the boundary B from being visually recognized by the observer and to improve its appearance.

Figure 14:
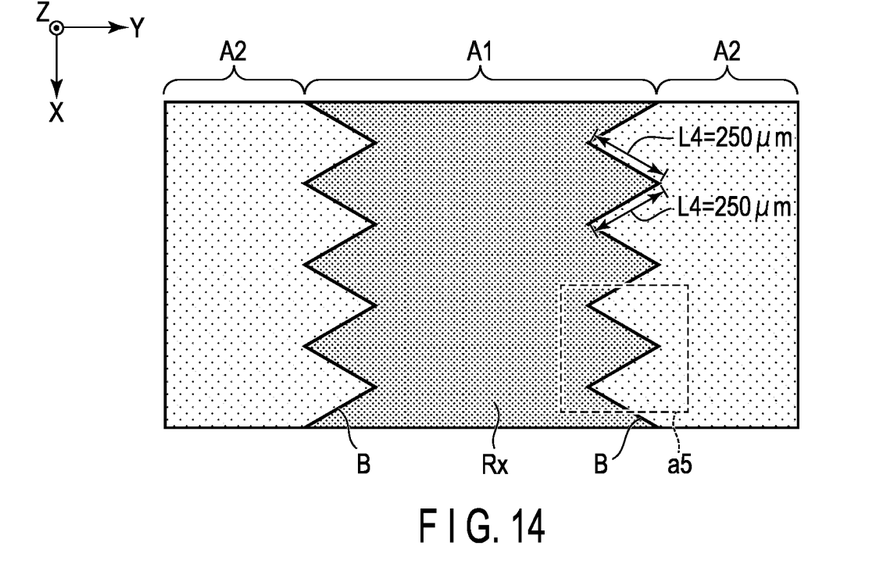
FIG. 14 is a schematic diagram showing a modified example of the shape of the boundary between the detection area and the non-detection area in the embodiment.

FIG. 14 is a schematic diagram showing a modified example of the shape of the boundary B between the detection area A1 and the non-detection area A2 in this embodiment. As shown in FIG. 14, the boundary B between the detection area A1 and the non-detection area A2 may be formed into a triangular wave in plan view, in which, for example, the triangles contained in the triangular wave are continuously arranged along the first direction X. Note that as shown in FIG. 14, the shape of the triangles contained in the triangular wave should preferably be an equilateral triangle in consideration of the arrangement of the openings OP and the dummy electrodes Dx to have the relationship of the close-packed structure. In FIG. 14, it is assumed that the length L4 of one side of the equilateral triangle contained in the triangular wave is, for example, 250 μm, but the length is not limited to this. For example, the length L4 of one side of the equilateral triangle contained in the triangular wave can be, for example, 100 μm or 500 μm. As mentioned above, in light of both the resolution of the human eye and the visual recognition, the length L4 described above should preferably be between 100 μm or more and 300 μm or less.

Figure 15:
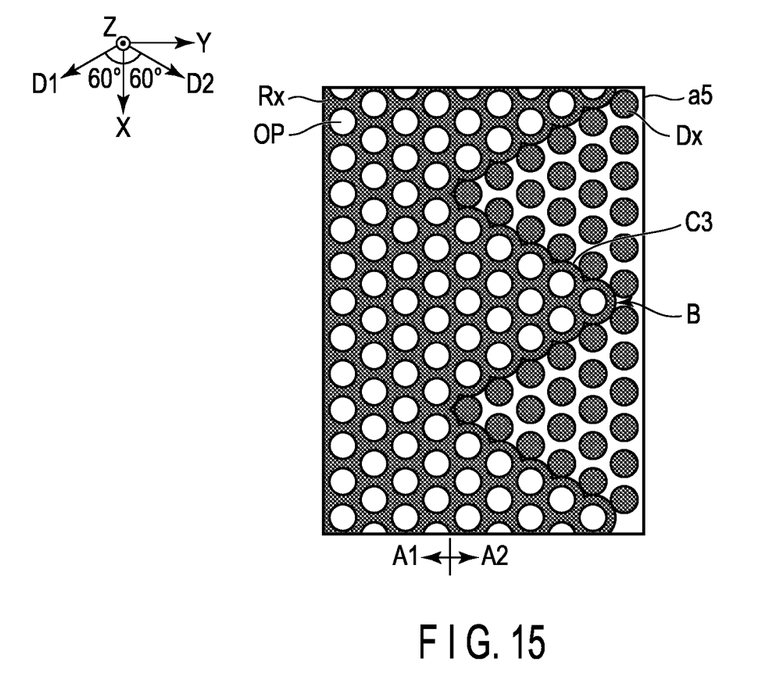
FIG. 15 is a partially enlarged view of the illustration of FIG. 14.

FIG. 15 is an enlarged view of an area a5 surrounded by dotted lines in FIG. 14.

As shown in FIG. 15, the boundary B between the detection area A1 and the non-detection area A2, as in the case of FIG. 13, contains a plurality of third curvature portions C3 disposed on the detection area A1 side across the boundary B and curved along outer circumferences of circular openings OP aligned along the direction D1 or the direction D. Note that the third curved portions C3 are in contact with the circular dummy electrodes Dx arranged on the non-detection area A2 side across the boundary B.

As shown in FIGS. 14 and 15, in the case where the boundary B between the detection area A1 and the non-detection area A2 is formed into a triangular wave, in which triangles contained in the triangular wave are continuously arranged along the first direction, when external light is made incident from the perpendicular direction of the boundary B, the incident light does not hit the tapered side surfaces of the detection electrodes Rx that form the boundary B4, or is not reflected by the tapered side surfaces of the detection electrodes Rx that form the boundary B4. Therefore, it is possible to suppress the boundary B4 from being visually recognized by the observer.

Figure 16:
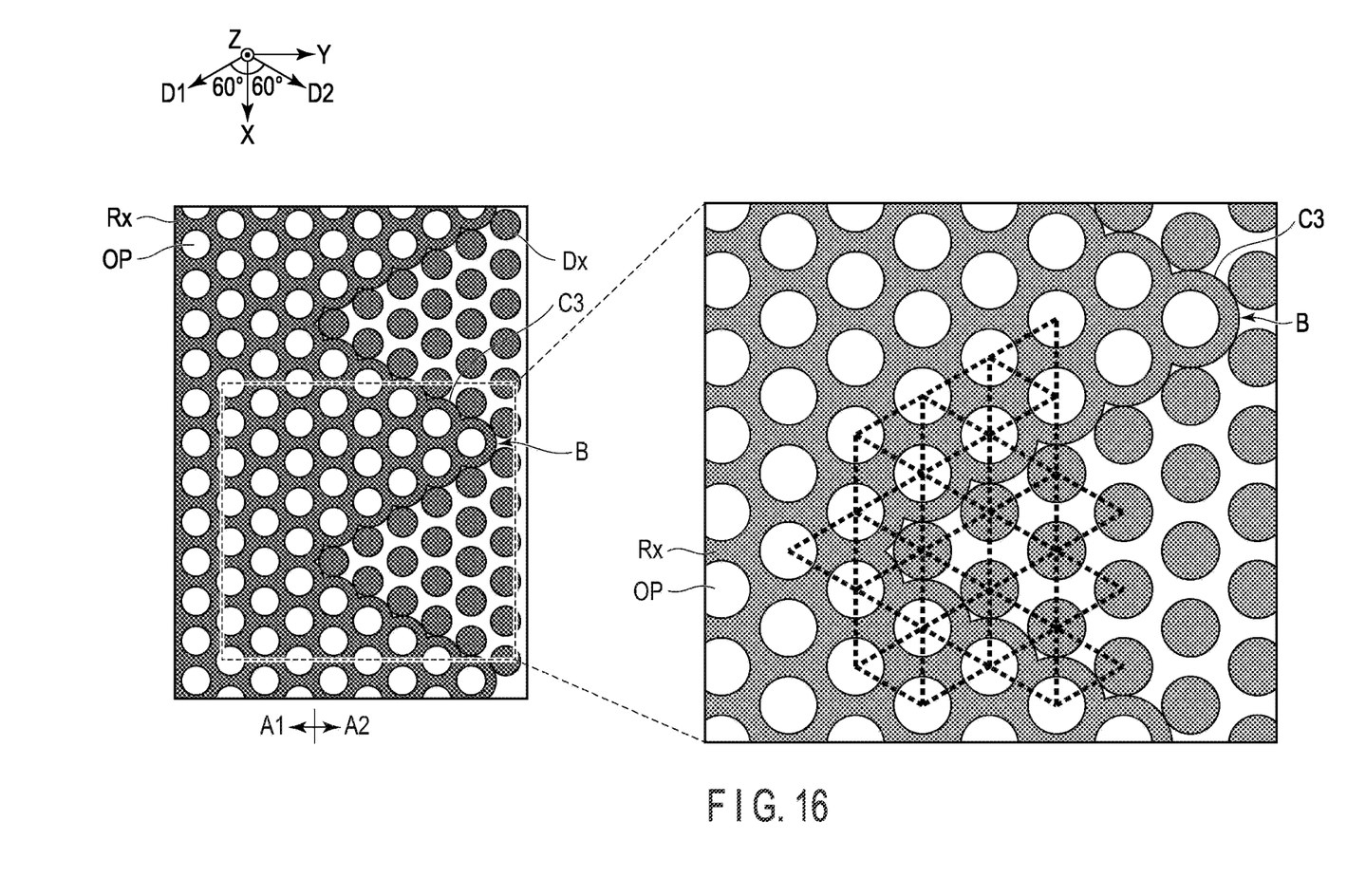
FIG. 16 is a partially further enlarged view of the illustration of FIG. 15.
Figure 17:
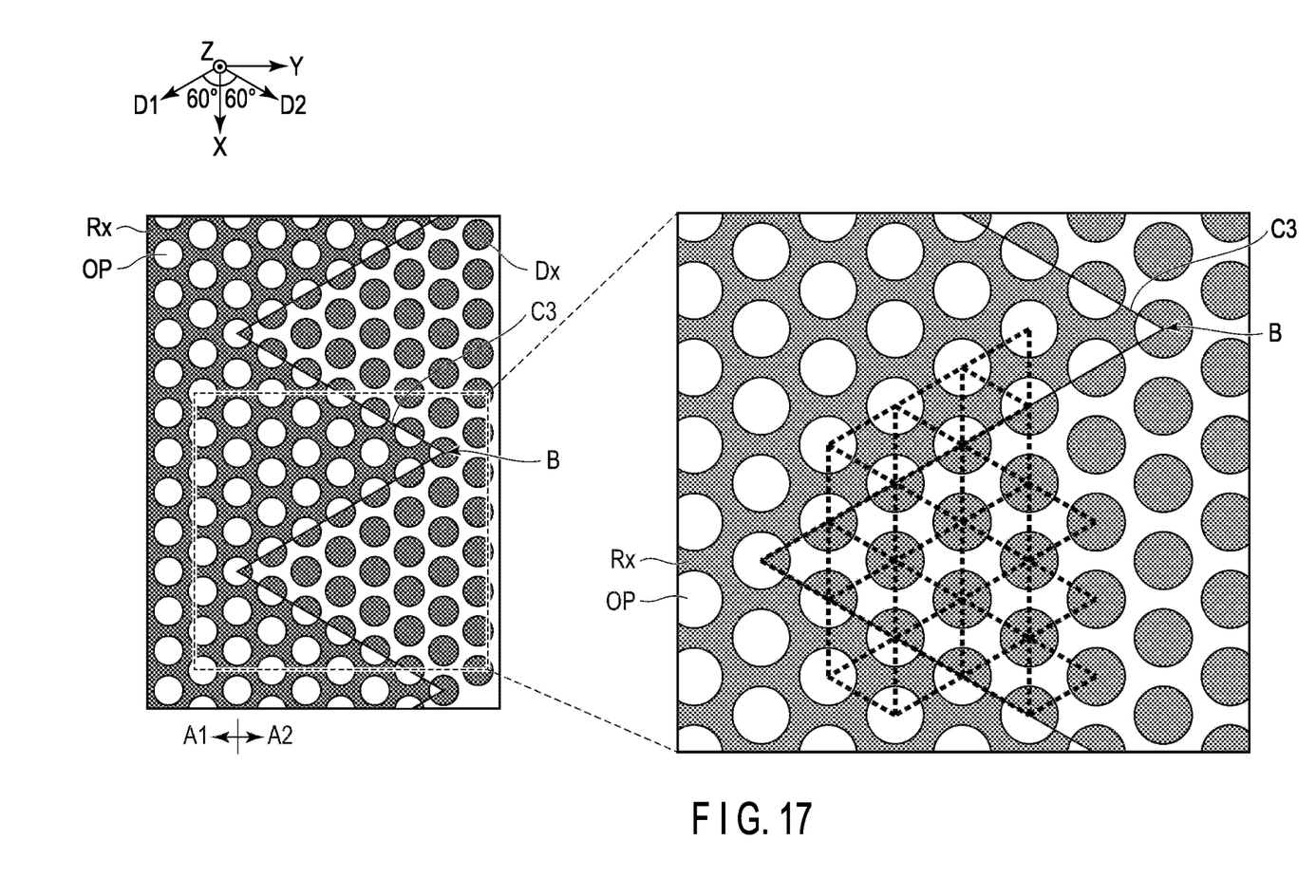
FIG. 17 is a schematic diagram showing a modified example of the shape of the boundary between the detection area and the non-detection area in the embodiment.

FIG. 16 is a partially enlarged view that further enlarges the illustration of FIG. 15 to illustrate the modified example shown in FIG. 17, and FIG. 17 is a schematic diagram showing a modified example of the shape of the boundary B between the detection area A1 and the non-detection area A2 in this embodiment.

According to the studies made by the inventors, it is known that when the boundary B is formed of the third curved portions C3, the occupancy ratio of the conductive film per unit area surrounded by the dotted line in FIG. 16 exceeds 50%. As described in FIGS. 10 and 11, according to the studies made by the inventors, as the occupancy ratio of the conductive film per unit area is closer to 50%, it is harder to visually recognize the boundary B.

When the circular openings OP formed in the detection electrodes Rx and the dummy electrodes Dx formed in the non-detection area A2 are cut along the direction along the close-packed structure, that is, any one of the first direction X, the direction D1 and the direction D2, the boundary B can be shaped into such a shape as that shown in FIG. 17. With this structure, it is possible to make the occupancy ratio of the conductive film per unit area surrounded by the dotted line in FIG. 17, 50%. In other words, it is possible to further suppress the boundary B from being visually recognized by the observer and to further improve the appearance.

In the embodiment described above, it is assumed that the openings OP formed in the detection area A1 (the detection electrodes Rx) and the dummy electrodes Dx formed in the non-detection area A2 are circular. When the openings OP and the dummy electrodes Dx are polygonal in shape, there is a possibility that the incident external light may have directivity when it is reflected thereon, but when the openings OP and the dummy electrodes Dx are circular in shape, it is possible to suppress imparting the directivity to the light when reflected. According to this, it is possible to suppress the boundary B from being visually recognized as compared to the case where the openings OP and the dummy electrodes Dx are polygonal in shape.

According to the embodiment described above, a detection device (a display panel PNL) in which the boundary B between the detection area A1 and the non-detection area A2 is not linear and a display device DSP comprising the detection device can be realized. Therefore, it is possible to suppress the boundary B between the detection area A1 and the non-detection area A2 from being visually recognized by the observer, and thereby provide a detection device and display device with an excellent appearance.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

What is claimed is:

1. A detection device comprising:
a substrate; and
a plurality of sensor electrodes provided on the substrate, extending along a first direction and arranged to be spaced apart from each other along a second direction intersecting the first direction, wherein
the plurality of sensor electrodes form a plurality of detection areas extending in the first direction and a plurality of non-detection areas adjacent to the plurality of detection areas along the second direction,
a boundary between each of the detection areas and each respective one of the non-detection areas is not linear,
the detection areas each include a number of circular openings in plan view formed therein, and the non-detection areas each include a number of dummy electrodes of a same shape as that of the openings,
the openings and the dummy electrodes are arranged to have a relationship of a close-packed structure,
the boundary between the detection area and the non-detection area is formed into a rectangular wave in plan view,
of the boundary of the rectangular wave, a first boundary extends along the first direction, semicircular openings are formed on a side of the detection areas across the first boundary, and semicircular dummy electrodes are formed on a side of the non-detection areas, and
of the boundary of the rectangular wave, a second boundary extends in a direction different from that of the first boundary, and includes
first curvature portions curved along outer circumferences of circular first openings adjacent along the first direction to the semicircular openings located on the first boundary, or outer circumferences of second openings arranged on a same row as that of the first openings and towards the side of the non-detection areas, and
a second curvature portion curved along outer circumferences of circular third openings adjacent to the first openings or the second openings, along a direction in which the relationship of the close-packed structure can be retained, and connecting each adjacent pair of the first curvature portions along the second direction.

2. A display device comprising:
the detection device of claim 1;
a common electrode opposing the sensor electrodes, which functions as a drive electrode;
a pixel electrode opposing the common electrode; and
a liquid crystal layer in which alignment is controlled by an electric field generated between the common electrode and the pixel electrode.

* * * * *